March 18, 1952 — T. H. MITZELFELD ET AL — 2,589,418
VALVE ROTATING DEVICE
Filed Oct. 31, 1950

Inventors
Thomas H. Mitzelfeld &
Andrew W. Zmuda
By Willits, Helwig & Baillio
Attorneys Patented Mar. 18, 1952

2,589,418

UNITED STATES PATENT OFFICE 2,589,418

VALVE ROTATING DEVICE

Thomas H. Mitzelfeld and Andrew W. Zmuda, Detroit, Mich., assignors to General Motors Corporation, Detroit, Mich., a corporation of Delaware Application October 31, 1950, Serial No. 193,221

9 Claims. (Cl. 123—90)

This invention relates to poppet valves for internal combustion engines and the like and has as its principal object to provide improved means for positively effecting axial rotation of the valve during engine operation.

A more specific object of the invention is to provide one-way clutch means operable in response to the lateral component of movement of the valve operating rocker to effect progressive rotation of the valve during valve reciprocation, said clutch means being in the form of a pair of substantially identical and similarly wound coil springs embraceably gripping the valve stem and anchored at their corresponding ends to the valve operating end of the rocker.

A still more specific object of the invention is to provide the one-way clutch means by arranging the aforementioned springs in intertwined or inter-threaded relation thereby obtaining the same positive drive of the valve stem without unnecessary extension of the valve stem above the valve return spring washer.

The manner in which these and further objects of our invention are accomplished will be apparent from the following description, having reference to the drawing wherein.

Figure 1:
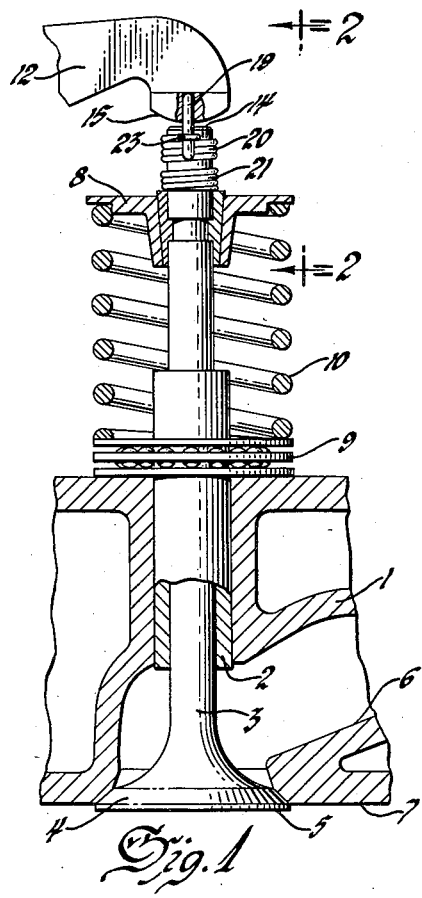
Figure 1 is a view of a portion of an internal combustion engine having a rocker actuated poppet valve incorporating one embodiment of our valve rotating device.
Figure 2:
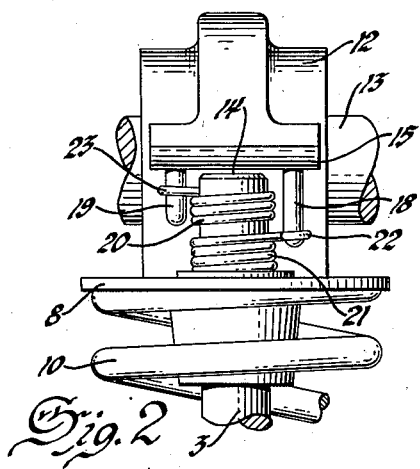
Figure 2 is an enlarged fragmentary elevational view taken substantially from line 2—2 of Figure 1.
Figure 1A:
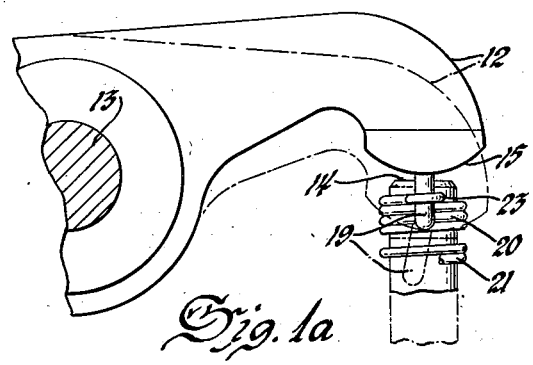
Figure 1a is a view similar to Figure 1 of reduced scale showing in full and broken lines respectively the extreme positions of the valve rocker during its oscillation about its axis.

Referring now to the drawing and first to Figures 1, 1a and 2 thereof in particular, the number 1 designates the frame structure of an internal combustion engine or the like in which is fitted a bushing 2 for slidably guiding the stem 3 of a poppet valve 4. The valve is shown in seated position with its head 5 blocking communication between a passage 6 and the underside 7 of the frame 1.

The valve stem 3 extends above the frame 1 and carries a washer 8. Between the washer 8 and an anti-friction thrust bearing 9 is a coil compression spring 10 which tends at all times to maintain the valve head 5 in closed position, the bearing 9 accommodating free rotation of the spring 10 with the valve relative to the frame 1. 12 represents a valve operating lever in the form of a rocker having an axis of oscillation coincident with the rocker mounting shaft 13 which is laterally distant from and extends generally perpendicular to the valve stem 3. Opposite and above the end 14 of the valve stem 3 the rocker 12 terminates in a camming face 15 which abuts the upward end face 14 of the valve stem in conventional manner. It should be understood that any suitable means may be provided for oscillating the rocker 12 about its axis 13, as for example the usual cam driven push rod (not shown) conventionally used in overhead valve type engines. Depending from the surface 15 of the rocker along opposite sides of the valve stem 3 are a pair of clutch spring driving pins 18 and 19, each of which is fixedly anchored in any suitable manner at its upper end in the rocker 12.

Embracing the valve stem 3 between the end face 14 and the valve washer 8 are a pair of clutches in the form of similarly wound helical springs 20 and 21 having their corresponding ends terminating in out-turned loops 22 and 23 which loosely fit and slidably receive the depending pins 18 and 19 respectively. The springs 20 and 21 at all times have a slight gripping engagement with the valve stem such as may be obtained by providing the valve stem with a diameter approximately .001" larger than the bore of the springs 20 and 21.

During operation, as the rocker oscillates between the full and broken line positions indicated in Figure 1a, the pins 18 and 19 have lateral component movements in alternate directions transversely of the valve stem, which movements are transmitted to the clutch spring loops 22 and 23. When this component movement occurs in a direction away from the rocker axis, the upper spring 20 tightens upon the valve stem and forces the stem to rotate in one direction while the lower spring 21 simultaneously releases the valve stem for rotation about the stem. Conversely, when the lateral component movement of the pins is toward the rocker axis the upper spring 20 slips rotatably about the valve stem while the lower spring 21 drives the valve stem in the same direction as before. Hence the valve is positively rotated during both valve closing and valve opening strokes by one or the other of the clutch springs 20, 21, and the friction imposed by the slipping clutch springs during their respective non-driving strokes does not result in causing retrograde valve stem rotation.

By arranging the springs in the manner described, double action rotation of the valve stem is obtained with clutch springs which are similarly wound, and because they are similarly wound they can be made identical for economy of manufacture and interchangeability at assembly.

Figure 3:
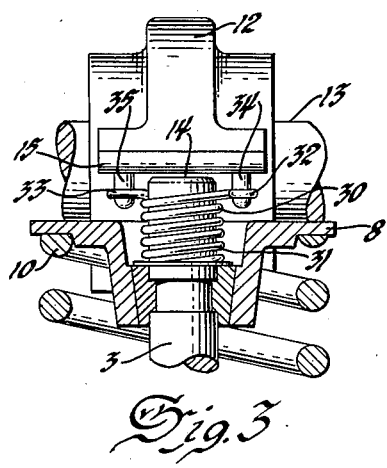
Figure 3 is a view similar to Figure 2 but incorporating valve stem clutch springs of modified form.
Figure 4:
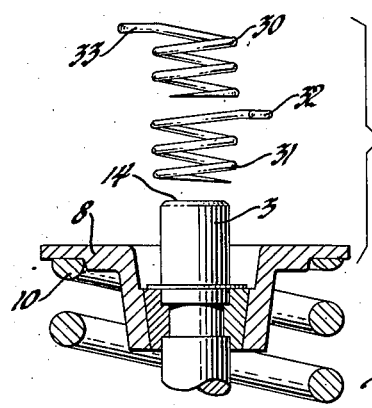
Figure 4 is an exploded view similar to Figure 3 further indicating the structure of the modified valve stem clutch springs.

In the modified form of our invention shown in Figures 3 and 4, clutch springs 30 and 31 are used which are similar to springs 20 and 21 previously described, in that they are identical with each other in construction and are similarly wound. They are also similarly provided at their corresponding ends with out-turned loops 32 and 33 which slidably receive driving pins 34 and 35. Springs 30 and 31 differ from springs 20 and 21 in having their convolutions in spaced relation. In this embodiment of our invention we intertwine or inter-thread the two springs 30 and 31 by screwing them together as shown in Figure 3 with the result that they occupy little more longitudinal space on the valve stem than does a single clutch spring, yet they obtain the same double action rotation of the valve stem as in the case of the separate longitudinally adjacent springs 20 and 21. By thus reducing the overall length of the two clutch springs in combination it is found that they may be installed on conventional valve stems whereas to use springs 20 and 21 it may be necessary in some instances to increase the height to which the valve stem extends above the washer 8. Springs 30 and 31 being of the same shape and size in all respects, have the same advantages of economy of manufacture and simplicity of assembly mentioned above with respect to springs 20 and 21.

In operation, springs 30 and 31 perform substantially in the same manner as described for springs 20 and 21, differing only in that by reason of having their out-turned loops 32 and 33 at the same elevation the springs 30 and 31 tend to be equally effective in rotating the valve. In the case of springs 20 and 21 the out-turned loops 22 and 23 are at different elevations with the result that the lower spring 21 enjoys a larger driving stroke than does the upper spring 20. In both cases, however, the rotation of the valve is positive and there is sufficient valve rotation obtained during at least one stroke of the rocker to effect the overall desired result.

Obviously the direction of winding of each pair of springs 20 and 21 and 30 and 31 could be reversed from that shown, this having the effect merely of reversing the directions of valve rotation relative to valve closing and valve opening. The same reversal could also be had, of course, by inverting each pair of springs from their positions shown in the drawing.

We claim:

1. In combination with a poppet valve having a stem guided for axial rotation and reciprocation, a valve operating rocker including a stem engaging portion having lateral movement in alternately opposite directions relative to the stem during valve reciprocation, a pair of similarly wound coil springs embracing the stem, each of said springs terminating in an out-turned loop at its end nearest said portion, said loops being on opposite sides of the stem and inter-engaged with said portion whereby each spring is oscillated rotatively about the axis of the stem during operation of said rocker.

2. In combination with a poppet valve having a stem guided for axial rotation and reciprocation, a valve operating rocker including a stem engaging portion having lateral movement in alternately opposite directions relative to the stem during valve reciprocation, a pair of coil clutch springs embracing and normally gripping the stem, said springs being identical in structure and terminating at corresponding ends in out-turned loops on opposite sides of the valve stem, and clutch driving pins depending from said portion and slidably received by said loops.

3. In combination with a poppet valve having a stem guided for axial rotation and reciprocation, a stem reciprocating lever fulcrumed for oscillation about an axis laterally of and in generally perpendicular relation to the stem, said lever having a stem engaging portion movable laterally of the stem during stem reciprocation, a pair of pins integrally associated with said portion and depending therefrom on opposite sides of the stem, and a pair of similarly wound axially adjacent helical springs embraceably gripping the stem and having corresponding ends secured to the respective pins whereby lateral movement of said portion during each reciprocatory stroke of the stem causes progressive rotation of the stem.

4. In combination with a poppet valve having a stem guided for axial rotation and reciprocation, a stem reciprocating lever fulcrumed for oscillation about an axis laterally of and in generally perpendicular relation to the stem, said lever having a stem engaging portion movable laterally of the stem during stem reciprocation, a pair of similarly wound helical springs having axially spaced apart convolutions embracing and normally gripping the stem adjacent said portion, said springs being inter-threaded such that the convolutions of one of the springs occupy the spaces between adjacent convolutions of the other spring, and means securing one end of said one spring and the corresponding end of the other spring to said portion for movement therewith laterally of the stem during valve reciprocation.

5. In combination with a poppet valve having a stem guided for axial rotation and reciprocation, a valve operating rocker having a stem driving portion, a pair of identical helical springs embraceably gripping longitudinally adjacent sections of the stem below said portion, and rocker extensions depending along opposite sides of the stem from said portion and secured to the uppermost end of each said spring.

6. In combination with a poppet valve having a stem guided for axial rotation and reciprocation, a valve operating rocker having a stem driving portion, a pair of helically inter-twined coil springs embraceably gripping the stem below said portion, each of said springs having a corresponding end formed with an out-turned projection, said projections being on substantially opposite sides of the valve stem, and means integral with said portion having slidable engagement with said projections longitudinally of the stem axis and in driving engagement with said projections laterally of the stem.

7. In combination with a poppet valve having a stem guided for axial rotation and reciprocation, a valve operating member including a stem reciprocating portion having lateral movement in alternately opposite directions relative to the stem during stem reciprocation, a pair of similarly wound helical clutch springs embracing longitudinally adjacent sections of the stem below said portion, and extensions of said portion depending along opposite sides of the stem and slidably secured to corresponding ends of the respective springs.

8. In combination with a poppet valve having a stem guided for axial rotation and reciprocation, a valve operating member including a stem reciprocating portion having lateral movement in alternately opposite directions relative to the stem during stem reciprocation, a pair of helically inter-twined coil clutch springs embracing the stem below said portion, and extensions of said portion depending along opposite sides of the stem and slidably secured to corresponding ends of the respective springs.

9. In combination with a poppet valve having a stem guided for axial rotation and reciprocation, a valve operating member including a stem reciprocating portion having lateral movement in alternately opposite directions relative to the stem during stem reciprocation, a pair of similarly wound coil clutch springs embracing the stem below said portion, and extensions of said portion depending along opposite sides of the stem and slidably secured to corresponding ends of the respective springs.

THOMAS H. MITZELFELD.
ANDREW W. ZMUDA.

No references cited.